Jan. 16, 1962  J. FAISANDIER  3,016,883
HYDRO-ELECTRIC SERVO MECHANISMS
Filed March 6, 1959  4 Sheets-Sheet 1
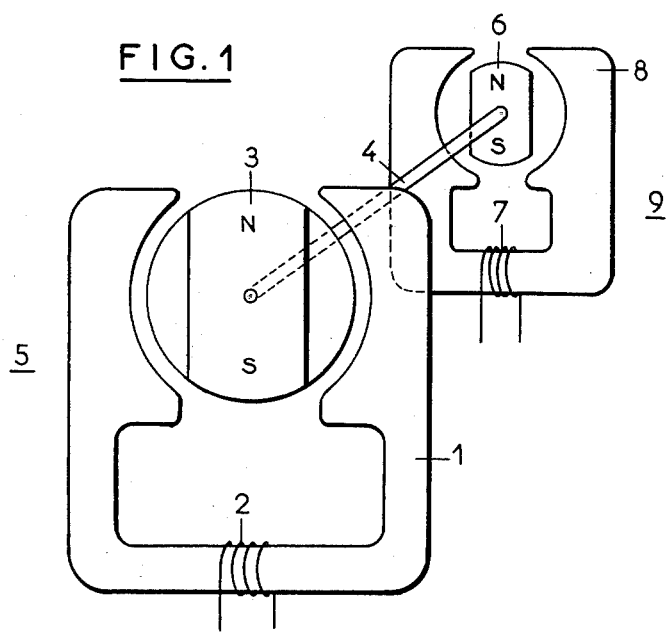
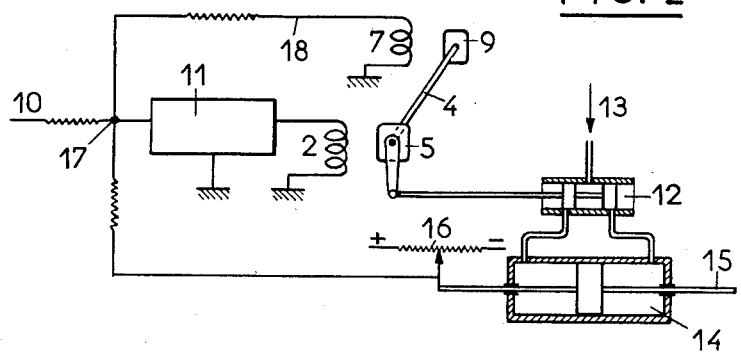
Inventor
J. Faisandier
By Glascock Downing Seebold
Attys.

Jan. 16, 1962   J. FAISANDIER   3,016,883
HYDRO-ELECTRIC SERVO MECHANISMS
Filed March 6, 1959   4 Sheets-Sheet 2

Inventor
J. Faisandier
By Glascock Downing Seebold
Attys

Jan. 16, 1962     J. FAISANDIER     3,016,883
HYDRO-ELECTRIC SERVO MECHANISMS
Filed March 6, 1959     4 Sheets-Sheet 3
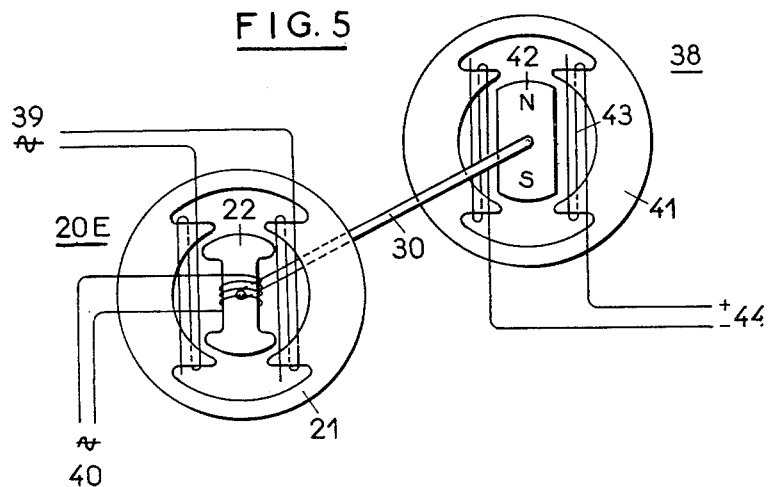
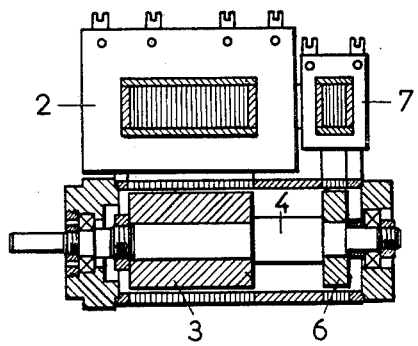
Inventor
J. Faisandier Jan. 16, 1962   J. FAISANDIER   3,016,883
HYDRO-ELECTRIC SERVO MECHANISMS
Filed March 6, 1959   4 Sheets-Sheet 4

Inventor
J. Faisandier

United States Patent Office 3,016,883
Patented Jan. 16, 1962

3,016,883
HYDRO-ELECTRIC SERVO MECHANISMS
Jacques Faisandier, 33 Blvd. Felix-Faure,
Chatillon-sous-Bagneux, France
Filed Mar. 6, 1959, Ser. No. 797,654
Claims priority, application France Mar. 24, 1958
4 Claims. (Cl. 121—41)

This invention relates to hydro-electric servo controls, and more particularly to the automatic piloting of aircraft, remote-controlled devices or the like.

It relates more especially to hydro-electric servo controls in which the final position of the hydraulic device is defined by a control voltage, known as the input voltage, the output movement of the hydraulic device being marked by an output voltage, providing the feed back with the cooperation of one or more damping voltages, in particular voltages marking the acceleration and speed, respectively, of the input or output movement.

The object of the invention is to incorporate in devices of the type just described:

First, motor units the motor of which operates as a torque motor on direct or alternating current, and which are particularly adapted to control the valves or hydraulic distributors of servo mechanisms having very low time constants. The motor units comprise a damping generator supplying a voltage proportional to the speed of the mechanical input movement in the hydraulic device;

Second, deviation indicators operating on alternating current, as inductive rotary potentiometers supplying a voltage substantially proportional to the angular deviation with respect to a mean position, with no appreciable friction of either electrical or mechanical origin.

Another object of the invention is to incorporate in devices of the known kind and in place of the conventional potentiometers, apparatus in which the windings can be doubled or tripled in one piece of equipment, if safety considerations make the use of several independent control circuits desirable.

The invention relates more particularly, by way of new industrial products, to the apparatus grouping in a single unit at least one torque motor and at least one damping generator, or grouping in a single unit at least one deviation indicator and at least one damping generator.

The invention will now be described by means of various examples of construction with reference to the accompanying drawings, it being understood that the generic scope of the invention is not limited to the particular features of the examples chosen for illustration.

In the accompanying drawings:

FIGURE 1 shows diagrammatically a motor unit comprising a torque motor and its damping generator.

FIGURE 2 shows a diagram of the connecting of this unit in the general circuit of a hydro-electric control.

FIGURE 5 shows diagrammatically the deviation indicator and damping generator unit used in FIGURE 4.

FIGURE 6 shows an industrial application, in axial section, of the unit shown diagrammatically in FIGURE 1.

Figure 3:
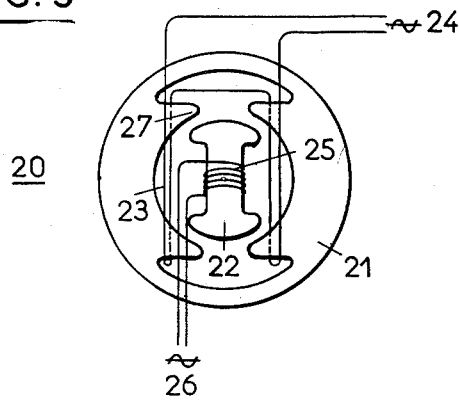
FIGURE 3 shows diagrammatically a deviation indicator.

In FIGURE 1, 1 designates the fixed armature, 2 the winding, and 3 the rotor constituted by a permanent magnet, mounted on the shaft 4. The whole unit constitutes the torque motor proper, referred to generally as 5. On the shaft 4 is mounted the rotor 6 of the generator, constituted by another permanent magnet, 7 is the winding of the fixed armature 8. The latter unit 9 constitutes the voltage generator.

The motor 5 operates on direct or alternating current; the angle of rotation provided is of the order of ±40°. The magnet 3 has been shown in its middle position, perpendicular to the direction of the field produced between the poles of the armature 1 by the action of the current passing through the winding 2. The rotation of the magnet 6 between the poles of the armature 8 produces in the winding 7 a voltage which is proportional to the speed of rotation.

FIGURE 2 shows the motor 5 and its winding 2 and the generator 9 and its winding 7. Reference character 10 indicates an electric signal given by any apparatus, such as a gyrometer, a gyroscope, a stabiliser, an automatic connector, or even manual control, or any other device permitting the automatic piloting of an aeroplane, missile or other contrivance. In the input circuit is the amplifier 11, in the output circuit of which is connected the winding 2. On the shaft 4 of the motor 5 is coupled the control linkage of the hydraulic distributor 12 of any conventional type and comprising a pressure inlet 13. This distributor controls the receiving apparatus, represented diagrammatically in the drawing by the jack 14, the rod 15 of which provides the output movement. The rod 15 drives the movable arm of a potentiometer 16 which gives an electric signal marking the output movement; this signal is transmitted at 17 to the input circuit 10 above the amplifier. The voltage supplied by the winding 7 of the generator 9 also reaches the point 17, via the circuit 18.

The device operates as follows:

On the arrival of a signal at 10, amplified at 11, the motor develops a torque which causes the distributor to be displaced until the output voltage supplied by 16 and the damping voltage 18 supplied by 9 balance the input voltage. This operation is conventional, the arrangement differing from what is known merely by the use, according to the invention, of the unit consisting of the torque motor and damping generator.

In FIGURE 3 is shown a deviation indicator referred to generally as 20 and constituted like an inductive rotary potentiometer by an armature 21 and a rotor 22 made of rolled sheet iron. On the armature 21 is located a winding 23, supplied at 24 with an alternating voltage, and on the core 22 is located the winding 25 which supplies at 26 the alternating output voltage, the amplitude of which is a function of the angular deviation of the core 22 with respect to its mean position. The field distribution is interrupted, for example by horns such as 27, so as to replace the sinusoidal function by a function which can be considered in practice as linear for a deviation angle, with respect to the mean position as shown, of up to 35°, which is sufficient in practice. The phase angle of the output voltage changes from 1°–0° when the deviation angle changes sign, which makes it possible to mark the direction of rotation of the rotor.

Figure 4:
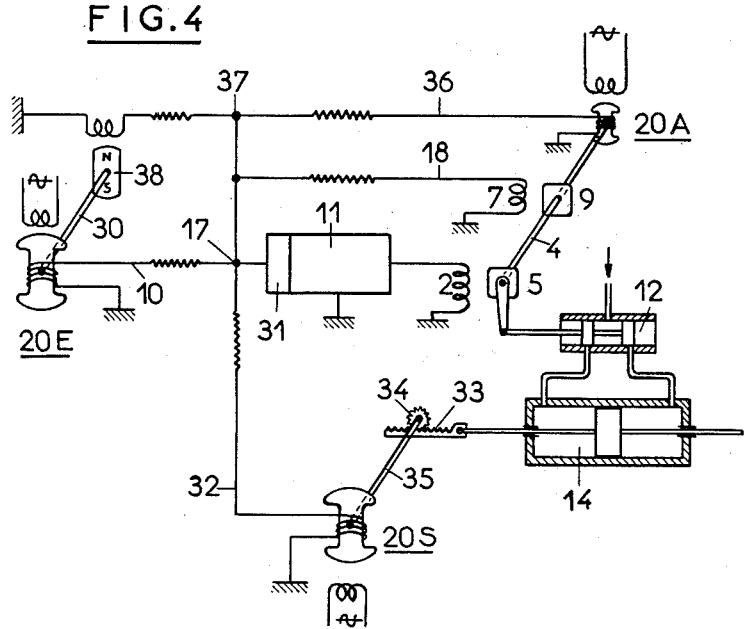
FIGURE 4 shows the connecting of several deviation indicators in the general circuit of a hydro-electric control.

In FIGURE 4 a diagram has been given showing a hydro-electric servo mechanism, in which the usual potentiometers have been replaced, according to the invention, by deviation indicators. For similar parts of the device the same reference characters have been used as in FIGURE 2. The input signal is given mechanically by a rotary movement imparted to the shaft 30 on which is mounted the rotor of the deviation indicator 20E which supplies the input circuit 10 with an alternating voltage which is proportional to the deviation angle imparted. The amplifier 11 is combined with a mixer 31 for the alternating and direct voltages. This mixer receives the alternating input voltage, the direct voltage supplied by the damping circuit 18 and the alternating voltages specified hereunder.

The potentiometer 16 of FIGURE 2 is replaced by the deviation indicator 20S, which supplies the circuit 32 with an alternating voltage marking the output movement.

For this purpose a rack 33 is solid with the rod 15 of the jack 14, which through the pinion 34 and the shaft 35 rotates the rotor of the indicator 20S through an angle proportional to the extent of the output movement.

On the shaft 4 of the torque motor is keyed the rotor of another deviation indicator 20A which supplies the circuit 36 with an additional damping voltage which introduces the element $dS/dt$, while the generator 9 provides the element $d^2S/dt^2$, S being a variable defining the output movement. The use of such an additional damping voltage is known, but it is usually supplied by a potentiometer. Finally, there can be introduced at the input, for example at 37, an additional voltage proportional to the speed of the input movement, which is likewise known per se and makes it possible to correct, for a given frequency range, the deviation proportional to the input speed which is introduced by the servo mechanism between the input and the output and which is an indispensable condition of stability.

According to the invention, the introduction of this additional voltage is effected by a generator 38 keyed to shaft 30 and supplying a direct voltage proportional to the input speed.

FIGURE 5 shows on a larger scale and in a diagrammatical manner, a unit consisting of the indicator 20E and the generator 38. The indicator 20E is identical with the indicator 20 shown in FIGURE 3. It is excited by alternating current at 39 and supplies an alternating voltage at 40. The generator 38 has a fixed armature 41 identical with that of the indicator. The rotor comprises a permanent magnet 42 keyed to the common shaft 30. The winding 43 supplies a direct voltage at 44.

A notable advantage of the device is that it comprises only elements, the windings of which can easily be doubled or even tripled if safety considerations make it necessary, so that the control can always be effected through an independent circuit or a safety circuit.

Besides the devices described, the invention also comprises, by way of new industrial products, the unit constituted by at least one torque motor and at least one damping generator and the unit constituted by at least one deviation indicator and at least one damping generator, the words "at least" being used to indicate the possibility of doubling or tripling all or part of a device on the same shaft, for reasons of safety.

Figure 7:
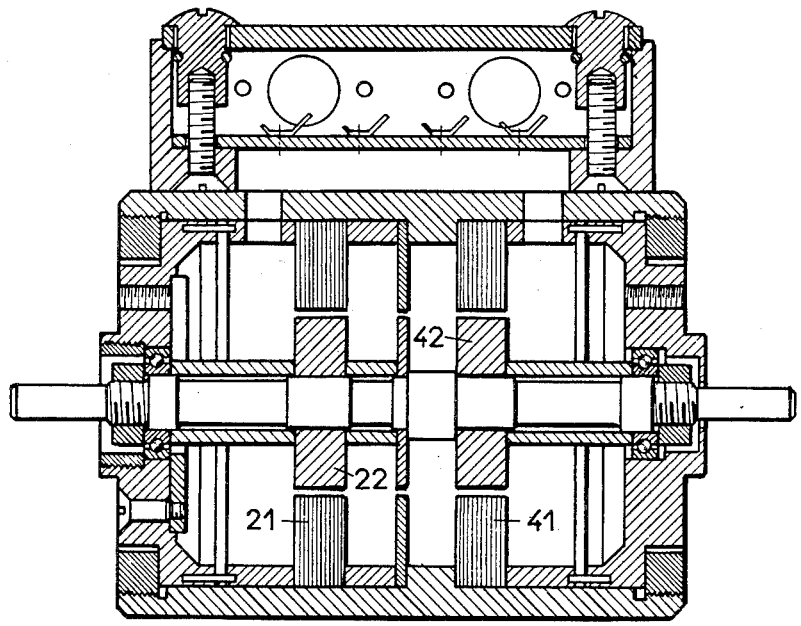
FIGURE 7 shows an industrial application, in axial section, of the unit shown diagrammatically in FIGURE 5.

By way of example, there is shown in FIGURE 6 an industrial embodiment of a torque motor-generator unit, in which the same references as in FIGURE 1 have been used, and in FIGURE 7 an industrial embodiment of the deviation detector shown in FIGURE 5.

What we claim is:

1. In a hydro-electric servo control mechanism of the type in which the final position of the hydraulic device is defined by an input voltage, the output movement of the hydraulic device deriving an output voltage providing a feedback voltage and controlling a valve distributor of the hydraulic device, the combination comprising a torque motor having a rotor and normally responsive to combined input and feedback voltages for effecting movement of the hydraulic device, a magneto-electric generator having a rotor, the said rotors being connected for rotation, means to combine the input voltage, the feedback voltage, and the output voltage of said generator, said torque motor being electrically connected to be controlled by the combined input and feedback voltages and the output voltage of said generator.

2. In a hydro-electric servo control mechanism of the type in which the final position of the hydraulic device is defined by an input voltage, the output movement of the hydraulic device deriving an output voltage providing a feedback voltage and controlling the valve distributor of the hydraulic device, the combination comprising a torque motor having a rotor and normally responsive to the combined input and feedback voltages for effecting movement of the hydraulic device, an angular deviation indicator having a rotor, the said rotors being connected for rotation, and means to combine said combined input and feedback voltages with the output voltage of said indicator, said torque motor being electrically connected to be controlled by the combined input and feedback voltages and the output voltage of said indicator.

3. In a hydro-electric servo control mechanism of the type in which the final position of the hydraulic device is defined by an input voltage, the output movement of the hydraulic device deriving an output voltage providing a feedback voltage and controlling a valve distributor of the hydraulic device, the combination comprising a torque motor normally responsive to an input voltage for effecting movement of the hydraulic device, an angular deviation indicator having a rotor and providing an output voltage upon rotation of its rotor, a magneto-electric generator having a rotor, both said rotors being connected for rotation, and means to combine the output voltages of said indicator and said generator, said torque motor being electrically connected to be controlled by said combined voltages and the feedback voltage.

4. In a hydro-electric servo control mechanism of the type in which the final position of the hydraulic device is defined by an input voltage, the output movement of the hydraulic device deriving an output voltage providing a feedback voltage and controlling the valve distributor of the hydraulic device, comprising in combination a magneto-electric generator and an angular deviation indicator, each having a rotor, and producing an output voltage upon rotation of its respective rotor, a torque motor having a rotor and normally responsive to combined input and feedback voltage for effecting movement of the hydraulic device, said three rotors being connected for rotation, and means to combine said combined input and feedback voltages with the output voltages of said generator and said indicator, said torque motor being electrically connected to be controlled by the combined input and feedback voltages and output voltages of said generator and indicator.

References Cited in the file of this patent

UNITED STATES PATENTS

| 2,188,834 | Fischel et al. | Jan. 30, 1940 |
| 2,408,770 | Frische et al. | Oct. 8, 1946 |
| 2,451,263 | Webb | Oct. 12, 1948 |
| 2,511,846 | Halpert | June 20, 1950 |

FOREIGN PATENTS

| 1,141,134 | France | Mar. 11, 1957 |